(12) United States Patent
Marchand

(10) Patent No.: US 9,969,008 B2
(45) Date of Patent: May 15, 2018

(54) DEVICE FOR HOLDING MECHANICAL PARTS

(76) Inventor: Alain Marchand, Marnaz (FR)

(*) Notice: Subject to any disclaimer, the term of this patent is extended or adjusted under 35 U.S.C. 154(b) by 586 days.

(21) Appl. No.: 14/233,117

(22) PCT Filed: Jun. 6, 2012

(86) PCT No.: PCT/EP2012/060692
§ 371 (c)(1),
(2), (4) Date: May 5, 2014

(87) PCT Pub. No.: WO2013/010719
PCT Pub. Date: Jan. 24, 2013

(65) Prior Publication Data
US 2014/0232073 A1 Aug. 21, 2014

(30) Foreign Application Priority Data

Jul. 15, 2011 (EP) .................... 11174136

(51) Int. Cl.
*B23B 31/173* (2006.01)
*B23B 31/12* (2006.01)

(52) U.S. Cl.
CPC .... *B23B 31/16158* (2013.01); *B23B 31/1253* (2013.01); *B23B 31/16183* (2013.01);
(Continued)

(58) Field of Classification Search
CPC .......... B23B 31/1253; B23B 31/16158; B23B 31/16183; Y10T 279/17615; Y10T 279/17658; Y10T 279/17743
See application file for complete search history.

(56) References Cited

U.S. PATENT DOCUMENTS

| 206,320 | A | * | 7/1878 | Hayden | ............... B23B 31/1253 |
| | | | | | 279/69 |
| 366,485 | A | * | 7/1887 | Jones | .................. B23B 31/1253 |
| | | | | | 279/56 |

(Continued)

FOREIGN PATENT DOCUMENTS

| CH | 535 624 | 4/1973 |
| DE | 88 07 447 | 8/1988 |

(Continued)

OTHER PUBLICATIONS

English language abstract of FR 2 511 289 published Feb. 18, 1983.
(Continued)

*Primary Examiner* — Eric A Gates
(74) *Attorney, Agent, or Firm* — DLA Piper LLP (US)

(57) ABSTRACT

This invention relates to a maintaining device for mechanical pieces, comprising a slider-holder formed by a body and a head with a central bore in which a part of the piece to be maintained is placed, the piece to be maintained exceeding the head, the head comprising a conical area, the maintaining device having at least two sliders and an actuation element for the sliders, wherein the head comprises at least two lateral bores, one leading into the conical area and the other to the central bore, the sliders are placed in the lateral bores, the sliders being adjustable in the lateral bores, the sliders exceeding the conical area of the head, the actuation element of the sliders being arranged to move the sliders in the corresponding lateral bores along an axis perpendicular to a longitudinal axis of the central bore.

13 Claims, 6 Drawing Sheets

(52) U.S. Cl.
CPC . *B23B 2231/2086* (2013.01); *B23B 2260/034* (2013.01); *B23B 2265/08* (2013.01); *Y10T 279/17615* (2015.01); *Y10T 279/17658* (2015.01); *Y10T 279/17743* (2015.01)

(56) References Cited

U.S. PATENT DOCUMENTS

| | | | | |
|---|---|---|---|---|
| 489,862 | A | * | 1/1893 | Blessing ............. B23B 31/1253 279/69 |
| 1,403,415 | A | * | 1/1922 | Iggberg ................ B23B 31/207 279/58 |
| 1,697,447 | A | * | 1/1929 | Albertson ........... B23B 31/1253 279/56 |
| 2,430,761 | A | | 11/1947 | Duphily |
| 2,654,611 | A | * | 10/1953 | Lee .................... B23B 31/1253 279/56 |
| 2,829,900 | A | * | 4/1958 | Davis ................. B23B 31/1253 279/56 |
| 3,422,709 | A | | 1/1969 | Rees |
| 4,508,180 | A | | 4/1985 | Klueber |
| 4,775,160 | A | | 10/1988 | Manschitz |
| 4,971,340 | A | | 11/1990 | Rall |
| 6,007,071 | A | * | 12/1999 | Middleton ............ B23B 31/123 279/62 |
| 2010/0109262 | A1 | | 5/2010 | Yu |

FOREIGN PATENT DOCUMENTS

| | | | | |
|---|---|---|---|---|
| DE | 20 2009 007227 | | 12/2009 | |
| FR | 584347 | A * | 2/1925 | ......... B23B 31/1253 |
| FR | 2 511 289 | | 2/1983 | |
| GB | 191129349 | A * | 7/1912 | ......... B23B 31/1253 |
| GB | 735703 | | 8/1955 | |
| GB | 920312 | A * | 3/1963 | ....... B23B 31/16158 |
| GB | 1295827 | A * | 11/1972 | ......... B23B 1/16166 |

OTHER PUBLICATIONS

English language abstract of CH 535 624 published Apr. 15, 1973.
International Search Report issued in International Application No. PCT/EP2012/060692 dated Jul. 3, 2012.
Written Opinion issued in International Application No. PCT/EP2012/060692 dated Jul. 3, 2012.

* cited by examiner

DEVICE FOR HOLDING MECHANICAL PARTS

CROSS REFERENCE TO RELATED APPLICATIONS

This application is a U.S. National Stage Application of International Application No. PCT/EP2012/060692 filed Jun. 6, 2012, which claims priority from European Patent Application No. 11174136.9 filed Jul. 15, 2011.

TECHNICAL DOMAIN

This invention relates to a device for holding mechanical parts, this device being in particular used in the field of precision machining. It concerns in particular a device able to maintain pieces having a particular shape or configuration, with a view to their machining or to a treatment to undergo. It also refers to a device allowing maintaining bars used in particular for producing mechanical precision pieces by free cutting. More particularly, it concerns a device for maintaining mechanical pieces, comprising a slider-holder formed by a body and a head, with a central bore in which a part of the piece to be maintained is placed, this piece to be maintained exceeding said head, the head comprising a conic area, the maintaining device comprising furthermore at least two sliders and an actuation element for said sliders.

PRIOR ART

Devices for holding mechanical parts are well known and largely used in particular for free cutting operations, rotating, milling or more generally machining those pieces. A kind of device commonly used is an elastic clamping chuck or split tongs. This kind of clamp comprises a rigid body and a head with slits and a central bore. A clamping ring is placed around the head. The piece to be machined is placed in the central bore in such a way that the area to be machined of this piece extends outside the head. When the piece is in place, the clamping ring is put around the head and actuated, generally in rotation, so as to narrow the slits of the head. Thus, the material of the head clamps the piece to be machined and keeps it in place. These clamping chucks use the properties of elasticity of the material forming the head of the tongs. Tongs similar to the conventional split tongs are in particular described in the utility model DE 88 07 447.1. The tongs described in this document comprise a rubber element in the slits between the jaws.

The conventional split tongs as well as the tongs described in this document show a certain number of limitations. By way of their conception, the elastic displacement of the elements forming the jaws is weak. The range of diameters of pieces that such clamps can receive is thus very limited. Moreover, if the diameter of the piece to be machined is slightly greater or slightly smaller than the nominal width of the split tongs, the piece will be clamped only at the rear or only on the front and not on a significant length of the tongs. This involves a less-than-optimal clamping and a possible marking of the pieces to be machined. A bad clamping results in defects during machining, in particular concentricity defects.

Another problem is due to the raw material in which the pieces are machined.

In practice, for instance when pieces are machined by free cutting operations, these pieces are often made from cylindrical bars obtained by rolling. When these bars come from rolling, they show size defects, which involve their diameter not being constant for the whole length of the bar. Typically, a bar can have diameter fluctuations of several tenth of millimeters as well as shape defects. Such fluctuations involve that the bars cannot be used as such in split tongs. Indeed, the range of diameters that certain split tongs can receive is often lower than the diameter fluctuations of the bars. In practice, the bars are first ground in order to bring their diameter in an acceptable tolerance range, before they can be machined. This grinding operation causes significant cost, both in handling and in the grinding itself.

Other types of clamping elements are described in particular in the publications U.S. Pat. No. 4,775,160, FR 2 511 289 and DE 20 2009 007227. These documents all concern mandrels for maintaining an object such as a drill-bit. Such mandrels allow to maintain an object according to a great range of diameters. However, because of their conception, they do not ensure a sufficiently concentric maintaining to authorize a machining complying with the usual requirements in the domain of precision mechanics. This lack of precision is in particular caused by the fact that the jaws are movable in a groove without being adjusted there and follow a jaw path with a thread.

The grooves are only used to guide the jaws during their longitudinal displacement, but they cannot ensure a precise positioning. Moreover, for the system to be able to work without blocking, jaws and thread must have a certain clearance, which is incompatible with the required precision for machining.

According to a current use of the clamping tongs, the bar in which the pieces to be machined are realized penetrates the clamping chuck according to a longitudinal axis. The conception of the above mentioned mandrels prevents the passage of a bar. These mandrels thus cannot be used in the domain in which this invention finds an important application.

The document GB 735 703 describes a clamping device formed by a cylindrical cage comprising longitudinal slits. These slits receive clamping elements. The clamping elements have a conic area, which is supported by a mandrel body. The surface of the body of the mandrel opposed to the conic area comprises a thread, which cooperates with a thread of a cap. The rotation of the cap leads to the displacement of the body of the mandrel, which for its part causes the displacement of the clamping elements.

As in the case of the mandrels, the clamping elements are floating in the slits. Moreover, the ring, during its rotation for the positioning of the clamping elements, applies a tangential stress and accordingly a deformation. These characteristics involve a precision defect in maintaining the pieces and thus in their machining. It is also to be noted that the device described in this document does not allow the passage of a material bar.

The U.S. Pat. No. 2,430,761 describes a clamping chuck having a body comprising four slits in which transversely movable jaws are placed. The jaws comprise inserts to adapt to the shape of the piece to be machined. The jaws have an inclined surface, which cooperates with an inclined surface of a ring. The longitudinal displacement of the ring causes a transversal displacement of the jaws.

This clamping chuck shows a certain number of drawbacks. Its conception is relatively complex, so that it is not possible to realize tongs of small size. It is thus only applicable to pieces having a diameter of several millimeters. The clamping chuck itself is held on a mandrel. As the mandrels generally do not have a precise positioning, the clamping chuck cannot be accurately positioned. The tongs comprise a clamping cap, placed around the body of the tongs. This cap is centred in relation to the body. If the body is badly positioned, the cap will not be better positioned and the piece will have defects. The cap has a relatively significant thickness. As a result the distance between the end in front of the jaws and the area in which the piece is machined is great. This involves a cantilever, which generates inaccuracies on the finished piece. The centre of the tongs is not empty, but comprises elements for actuating the tongs. Therefore, it is not possible to pass a bar.

The patent CH 535 624 concerns a clamping chuck comprising a body with cavities. Jaws are introduced into the cavities. The body comprises a conical front area and a conical rear area. When the tongs are used on a machine, a nut presses the conical areas and displaces the jaws so as to clamp the piece to be maintained.

Regarding its conception, the clamping chuck according to that invention shows an important drawback. Indeed, making cavities in a rigid body, for instance in steel, necessarily implies that this body opens or in other words, that the cavities go apart. This opening cannot be done in a controlled way and the precision of the clamping chuck cannot be assured. Moreover, the length of the jaws is very great in relation to the body of the tongs. Therefore, the jaws are not guided in an optimal way in the body and the precision of the positioning and accordingly of the machining suffers. It is thus not possible to guarantee a precise machining with such tongs.

Another kind of maintaining device is known under the name of guide bush. Such a bush is generally screwed on the structure or the shaft of a machine. It maintains the bar to be machined in such a way that it can rotate inside the bush while the latter can either remain stationary or rotate, according to the use.

The present guide bushes need to use bars having minimal concentricity defects. In practice, the as-rolled bars must be ground before they can be machined when they are guided in a guide bush. Indeed, the concentricity defects or the diameter fluctuations cause important frictions, which can generate degradations of the piece and/or of the guide bush and which prevent a precise machining.

The existing tongs and bushes are functional when the part of the piece to be machined, which is placed in the tongs is a cylinder with constant diameter.

For pieces with a particular shape, this sort of tongs cannot be adapted. As an example, if the piece to be machined comprises an area with large diameter followed by an area of small diameter and finally by the area to be machined, the passage of the area with large diameter in the bore of the head can cause problems. Indeed, it is necessary to have a head with a great elasticity to let through the area with large diameter and to clamp the head around the area of small diameter. The elasticity of the head is due to the deformation of the material in which this head is made. It is clear that this elasticity is limited, which raises problems when the piece to be maintained has areas with large differences in diameter.

For pieces, which cannot be maintained by this kind of tongs, there are other devices for maintaining. A known example is a mandrel with jaws comprising a rack. This mandrel comprises a thread acting on the rack of the jaws so as to displace them simultaneously and to ensure the centring of the piece to be machined.

These mandrels that allow this kind of clamping are relatively difficult to be machined and thus expensive. Moreover, the positioning and the clamping of the piece to be machined is relatively long and difficult to automate.

Such a mandrel is thus not ideal and reserved for the cases where the elastic clamping tongs cannot be used.

Furthermore, the conception of these mandrels prevents reaching the required precision, in particular as the rack and the thread must show a certain clearance.

A certain number of tongs or clamping tools of prior art have jaws for maintaining the piece to be machined, these jaws being constrained towards the piece by means of a threaded ring. The rotation of the ring leads to its displacement, which acts on the jaws. A problem with these systems is that the ring applies a tangential force to the jaws. This tangential force causes a deformation of the jaws, which leads to a positioning error of the piece. The precision of the machining is affected.

A certain number of devices for maintaining of prior art have their middle area used for the actuation of the jaws or clamping elements. These devices thus do not allow the passage of a bar and thus are not adapted for free cutting operation.

SUMMARY

This invention intends to avoid the drawbacks of prior art devices by realizing a device for holding mechanical parts offering a large range of possible uses. This holding device is however more simple to realize than a mandrel with jaws and is more flexible to use.

This aim is reached by a device for holding mechanical pieces wherein the head comprises at least two lateral bores leading on the one hand in said conical area and on the other hand in said central bore, in that said sliders are placed each in one of said lateral bores, these sliders being adjusted in the lateral bores in order to be able to slide there, said sliders exceeding the conical area of said head, the actuation element of said sliders being arranged to displace said sliders in the corresponding lateral bores along an axis perpendicular to a longitudinal axis of the central bore.

In the device, holding the piece to be machined or to be treated is not achieved by the elasticity of the material forming the clamping tool, but by sliders. This allows to give to the clamping elements strokes of a very large amplitude, without risking to deform the device. The result is that it is possible to maintain pieces having for instance strongly different diameter areas.

Using the principle of the invention, it is also possible to maintain, in a very efficient way, pieces with an unconventional shape. As an example, it is possible to maintain pieces with one or more flattenings, pieces having square-shaped, hexagonal, or other cross-sections, threaded areas, conical pieces, etc.

The conception of the holding device of the invention, and in particular of the sliders, allows an optimal positioning of the piece, even if the latter shows concentricity defects and areas in which the diameter shows important fluctuations.

The device can be used both as clamping chuck with the function to keep the piece firmly in place, and as guide bush with the function to maintain the bar used for producing the pieces, without keeping it in rotation. Moreover, the maintaining device allows the passage of bars because it is hollow in its centre. It is thus possible to use it for a production by free cutting operation.

Whatever the way to maintain the piece, by guiding or by clamping, the device of the invention ensures a much better positioning precision that the prior art devices. This positioning precision has the effect that the use of bars with diameter fluctuations of several tenth of millimeters is possible, allowing at the same time the machining of pieces with a manufacturing tolerance of some hundredths of millimeters i.e. a relatively usual tolerance in the domain of precision mechanics. As a result, grinding the bars before machining can be avoided in most cases, without reducing the quality of the finished pieces.

By way of the conception of the device of the invention, there is no tangential force on the sliders. Therefore, there is no deformation of the sliders nor displacement of the piece, leading to inaccuracies during the machining. Furthermore, the pieces can be put in place automatically and the maintaining device can be locked simply, also automatically.

Another advantage of the device of the invention is the fact that the sliders have a relatively great clamping area, thus a large contact surface with the piece to be maintained. Moreover, this clamping area has an end very near to the area in which the piece is machined. Therefore there is practically no cantilever so that the piece is maintained in a rigid way in the device. The precision of machining is still improved.

It is also possible to provide that the device comprises an area preventing any unwanted splinters or materials from penetrating into the clamping device. These splinters can generate different problems such as marks on the pieces, frictions, machining defects, etc. This area preventing the unwanted materials from penetrating into the tongs can be associated to a flow of fluid under pressure, which has the effect of chasing the splinters away and show a machining area free of all waste.

According to a particular embodiment of the invention, the maintaining device can have a compression spring whose function is to adjust the clamping by the piece being machined, so as to ensure an optimal maintaining during this machining. This allows to use material bars with diameter fluctuations, concentricity defects or other defects which render them unusable with prior art devices for maintaining.

BRIEF DESCRIPTION OF THE DRAWINGS

This invention and its advantages will be better understood with reference to the annexed figures and to the detailed description of a particular embodiment, in which.

EMBODIMENTS

Figure 1:
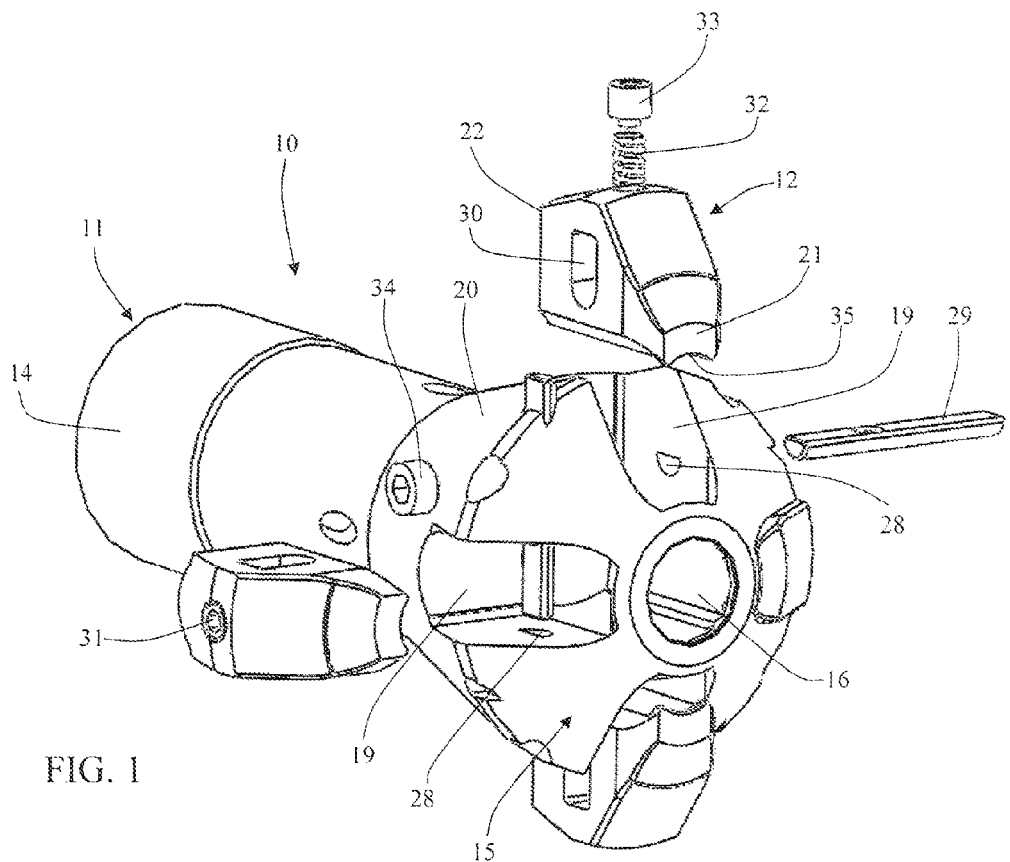
FIG. 1 is an exploded view of a part of the device of the invention according to a first embodiment of the invention.
Figure 2:
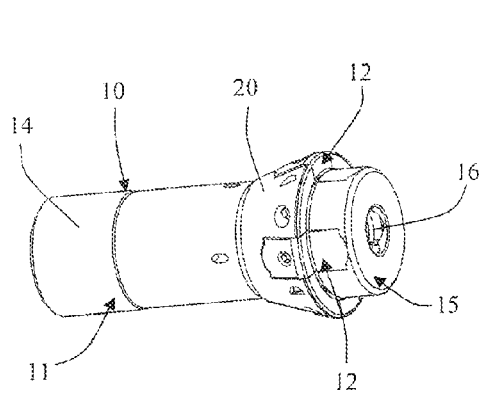
FIG. 2 is a perspective view of a part of the device of the invention according to a second embodiment.
Figure 3:
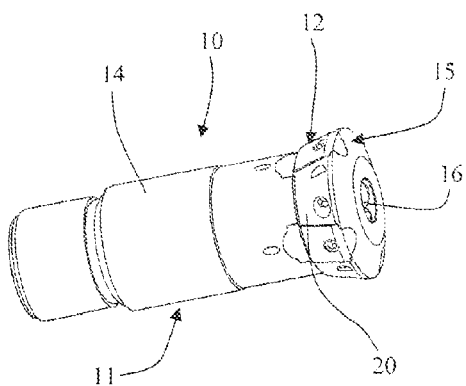
FIG. 3 is a perspective view of a part of the device of the invention according to a third embodiment.
Figure 4:
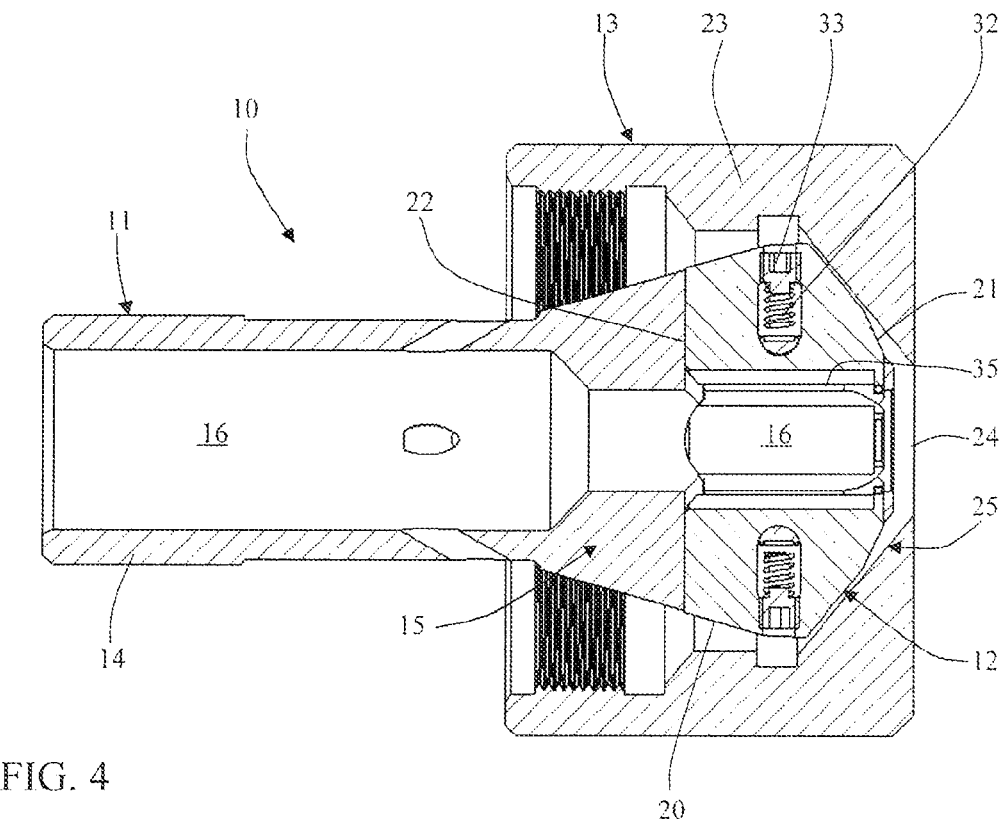
FIG. 4 is a view partially in section of the maintaining device of the invention, in a first open position.
Figure 5:
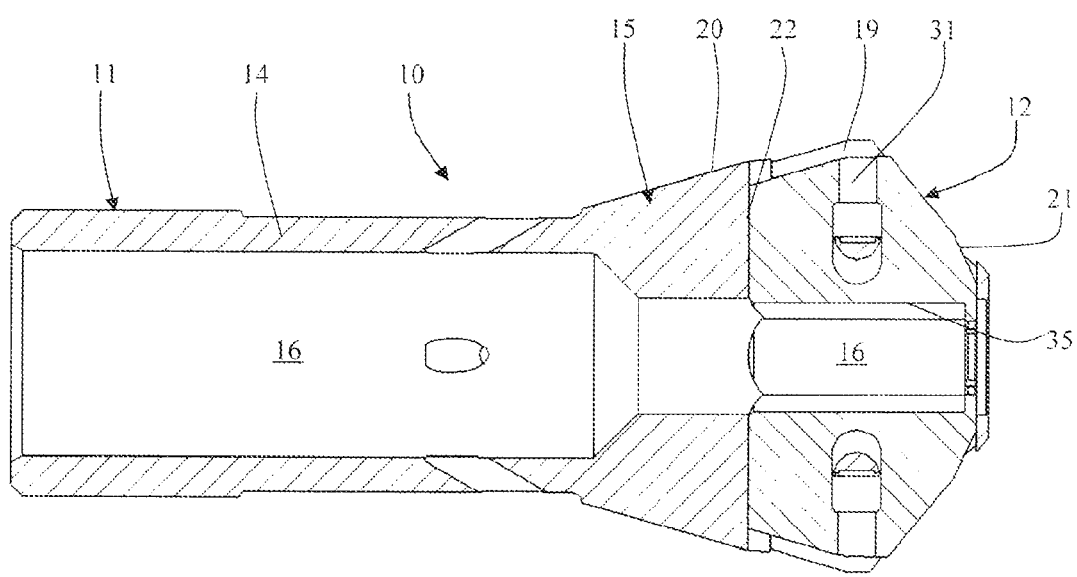
FIG. 5 is a view similar to FIG. 4, in a second closed position.

With reference to the figures, the maintaining device 10 of the invention can take different shapes, three of them being disclosed here. One of the shapes, called large opening width tongs, is shown in FIG. 1. Another shape, called clamping chuck, is shown in particular in FIG. 2. The third shape, called guide bush, is shown in FIG. 3. In the present invention, the notion of holding a piece comprises both the notion of clamping and that of guiding.

The holding device 10 essentially consists of a slider-holder 11, sliders 12 and an actuation element 13 for the sliders. The slider-holder 11 comprises a body 14 and a head 15. The body 14 is of generally cylindrical shape. The body 14 and the head 15 comprise a central bore 16 with an inner diameter higher than the diameter of the mechanical pieces 17 to be maintained. In other words, the relation between the size of the central bore and the pieces to be maintained is such that the piece to be maintained can be introduced into the central bore. According to the use of the holding device, the slider-holder 11 can be driven in rotation by a machining machine for instance. This rotating drive is achieved in a conventional way and is not described here in more detail.

The slider-holder 11 can also be foreseen for holding and guiding the mechanical piece 17 without rotating. In this case, the piece can rotate in the holding device.

The body 14 of the slider-holder 11 is integral with the head 15, these two elements being generally machined in the same material block. This head comprises, in the illustrated examples, four lateral bores 19. It is also possible to provide less lateral bores, for instance two or three, or more bores, for instance six or eight bores. The number of bores can depend on the size of the pieces to be maintained, on their particular shape, on the desired clamping force, etc.

The head 15 of the slider-holder comprises a conical area 20. The lateral bores 19 open on the one hand into the conical area 20 of the head and on the other hand, into the central bore 16 of this head. The sliders 12 are provided for being received each in a lateral bore 19. The size and the respective shapes of the lateral bores 19 and of the sliders are such that the sliders 12 can move longitudinally in the lateral bores 19 without clearance or with a weak clearance. This longitudinal displacement is done according to an axis essentially perpendicular to a longitudinal axis 20' of the central bore 16. These sliders furthermore slightly exceed the conical area 20 of the head when they are supported by the piece 17 to be maintained. It is to be noted that in function of the mechanical piece to be maintained, the sliders can be changed. The area of the slider supported by the piece to be maintained or clamping area can thus be adapted to the particular shape of this piece. According to a particular embodiment of the invention, the clamping area of the sliders has a shape of an arc of a circle, in cross section. According to an advantageous variant, a cross section of the slider can show several arcs of a circle essentially aligned, with different radii of curvature. An area with a small radius of curvature can be realized at the centre, an area with a slightly greater radius of curvature can border the first area and a third area with a greater radius of curvature can surround the two first ones. This allows an optimal maintaining for three different diameters of pieces or bars to be machined. It is clear that other shapes or a different number of sectors can be conceived. Likewise, the length of the slider can be adapted to the diameter of the piece. According to a particular use, it is possible that the holding device 10 comprises more lateral bores 19 than sliders 12. As an example, it is imaginable to have a head 15 comprising six lateral bores and to use only three sliders. This allows a great flexibility of use.

According to an advantageous embodiment, the sliders have a slightly bent front 21 and back 22. This allows to ensure an optimal displacement and maintaining of the sliders in the corresponding lateral bore. In practice, the sizes of the sliders and those of the lateral bores are adapted in such a way that the sliders can slide in the bores practically without clearance or with a very weak clearance. This kind of adjustment is known under the name of sliding adjustment.

The actuation element 13 of the sliders can take different shapes. In the embodiments illustrated by the FIGS. 1, 4-7, 9 and 10, this actuation element is a cap 23.

This cap comprises a central passage 24 and a conical inner area 25. It is arranged around the head 15 of the holding device so that the piece 17 maintained in the central bore of the head and of the body also passes through the central passage 24 of the cap.

In position of use, the conical inner area 25 of the cap is placed near the conical area 20 of the head.

When the cap 23 is displaced backwards in relation to the body, i.e. in a direction opposed to the area in which the mechanical piece is machined, the conical inner area 25 of the cap is supported by the areas of sliders 12 which exceed the conical area of the head. The contact between these inclined planes has the effect of pressing the sliders towards the central bore of the head. These sliders 12 move and are supported by the mechanical piece 17 so as to keep it in place. This displacement is done along an axis essentially perpendicular to the longitudinal axis 20' of the central bore.

The displacement of the sliders is achieved thanks to the relative displacement of the slider-holder 11 in relation to the cap 23. This relative displacement is in principle achieved by displacing the slider-holder while keeping the cap stationary.

According to a preferred embodiment, the displacement of the slider-holder 11 forwards or backwards is achieved by means of hydraulic, pneumatic, or electrical means connected to the machine on which the maintaining device 10 is installed.

As it can be easily understood, the relation between the longitudinal displacement of the slider-holder 11 and the transversal displacement of the sliders 12 depends on the slope of the conical inner area 25 of the cap. The slope can be defined by the angle formed by a generatrix of the cone with the longitudinal axis 20' of the central bore. The higher this angle is, the higher the transversal displacement of the sliders will be for the same relative displacement of the cap and of the slider-holder. In a similar way, the relation between the longitudinal force applied on the cap and the clamping force of the piece 17 also depends on the slope of the conical inner area 25 of the cap 23. The higher this angle is, the higher is the force to be applied on the cap for a constant clamping force.

Figure 6:
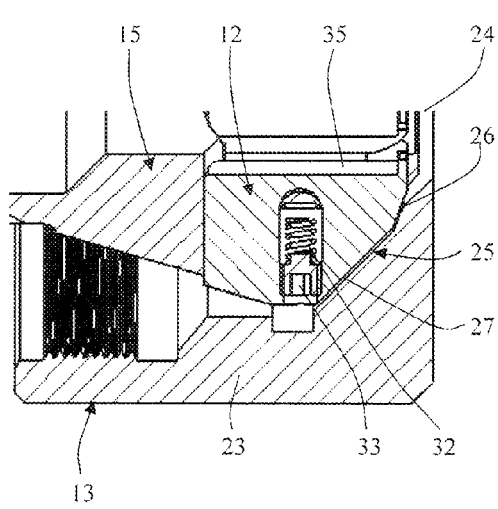
FIG. 6 is a schematic section view of a detail of the device of the invention according to a particular embodiment in an open position.
Figure 7:
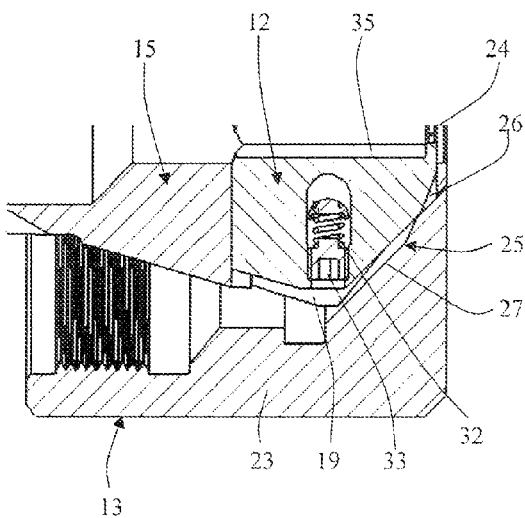
FIG. 7 is a view similar to FIG. 6, in a closed position.

According to an advantageous variant shown by the FIGS. 6 and 7, the conical inner area 25 of the cap can be formed by several conical parts with different angles. As an example, a first part 26 can have a wide angle allowing an important displacement of the sliders for a small displacement of the cap. A second part 27 can have a smaller angle to ensure a greater clamping force.

By adequately determining the angles of different parts of the cap, it is possible to optimize the displacements of sliders as well as the clamping forces.

As it is visible in the embodiment disclosed in FIG. 1, the head 15 comprises, for each slider 12, a groove 28 to receive a bar 29. The sliders 12 each comprise a cross slit 30. When positioning the sliders, the bar 29 is introduced in the corresponding groove 28 and in the slit 30. The sliders furthermore comprise an at least partially threaded hole 31 with an axis essentially perpendicular to a longitudinal axis of the bar. This hole 31 contains on the one hand a return spring 32 and on the other hand an adjusting screw 33. One of the ends of the return spring 32 is supported by the bar 29 and the other end by the adjusting screw 33.

The function of the return spring 32 cooperating with the bar 29 is to displace the sliders 12 to the outside of the head when the cap, or more generally the actuation element, does not press them towards the central bore. Thanks to this, the sliders leave the passage free for the positioning and the retraction of the piece to be machined. The bar 29 can be maintained in the groove 28 by means of a maintaining screw 34.

The sliders such as illustrated in FIG. 1 comprise a bottom side 35 supported by the piece to be maintained. This side can have a curved profile for adapting to the majority of the pieces to be maintained or rather, have a specific profile for the piece to be maintained.

Figure 8:
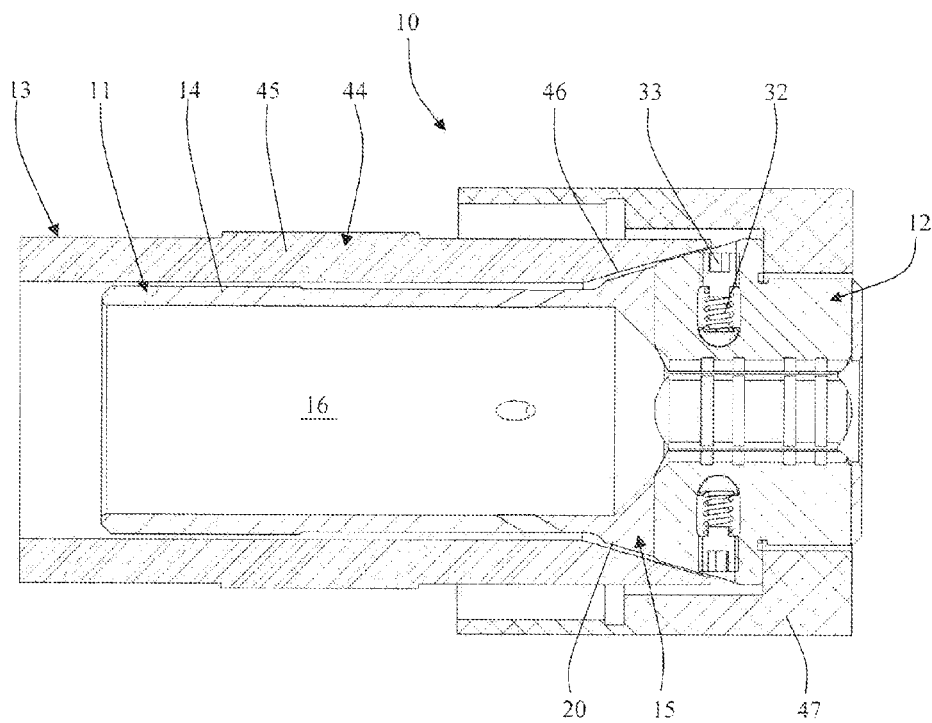
FIG. 8 is a schematic section view of a variant of the device of maintaining of the invention.
Figure 9:
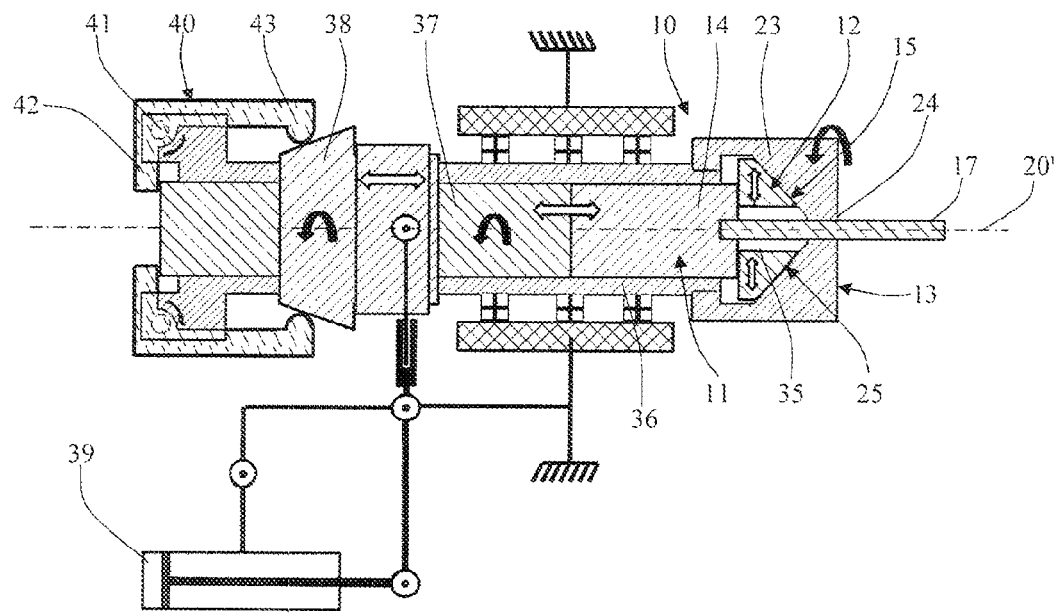
FIG. 9 is a schematic view of the device of the invention when it is used on a machine, in the position shown by FIG. 4.
Figure 10:
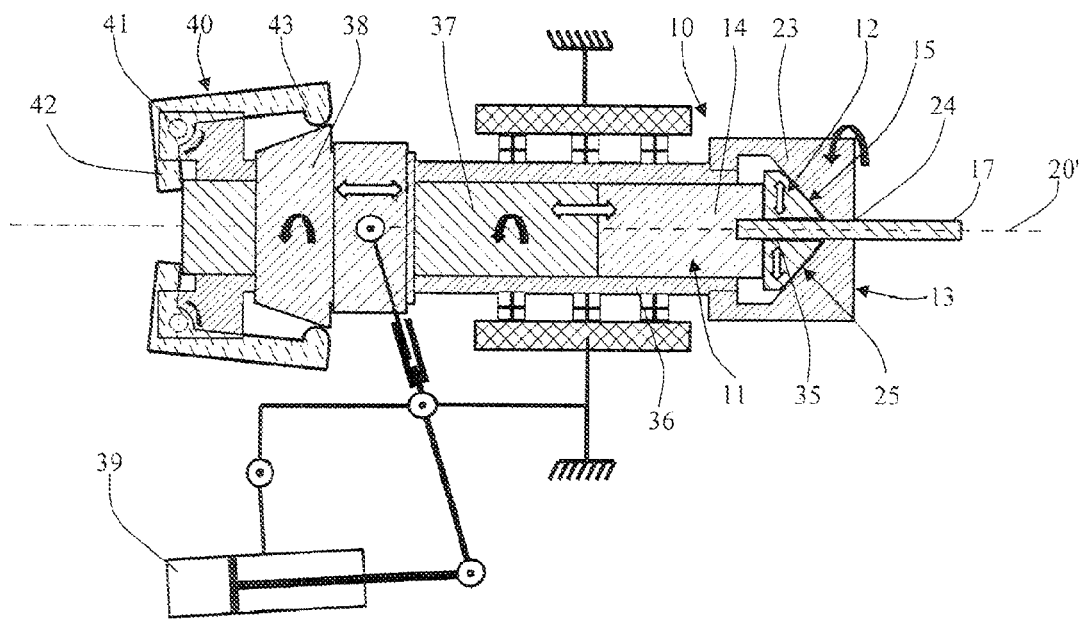
FIG. 10 is a view similar to FIG. 9, in the position disclosed in FIG. 5.
Figure 11:
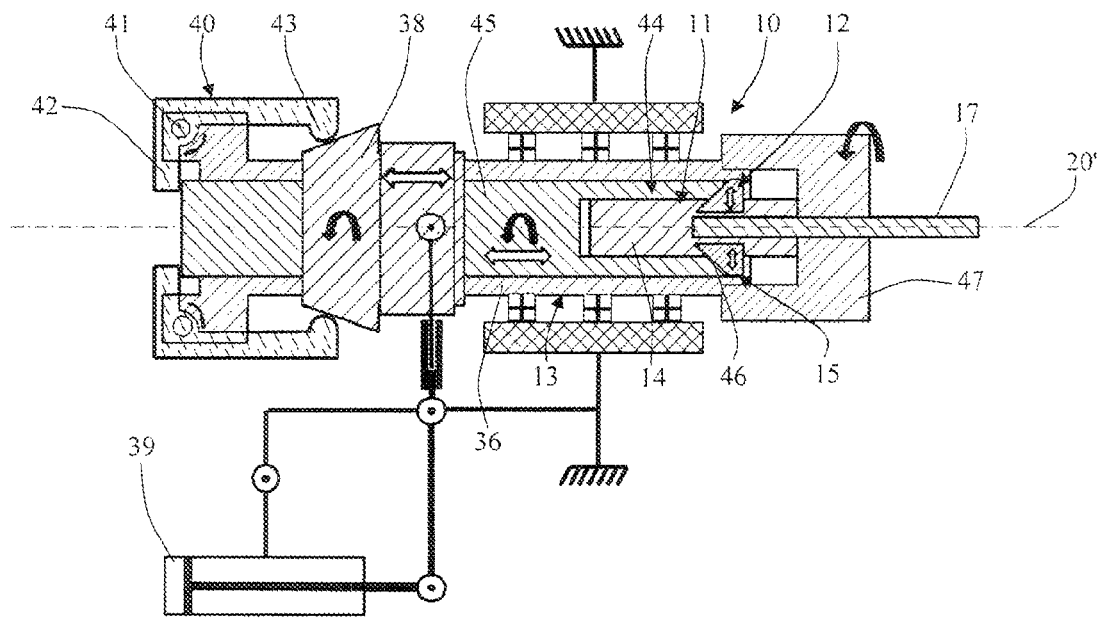
FIG. 11 is a schematic view of the embodiment of the device of the invention such as represented by FIG. 8, used on a machine.
Figure 12:
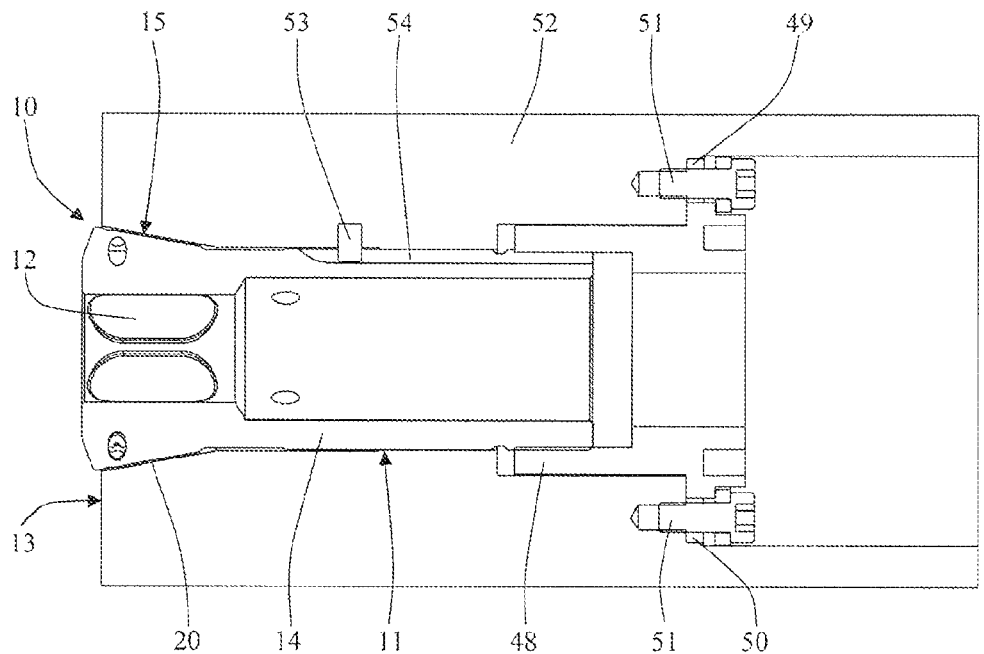
FIG. 12 is a partial section view of a maintaining device of the invention mounted on a machine, according to a first embodiment.
Figure 13:
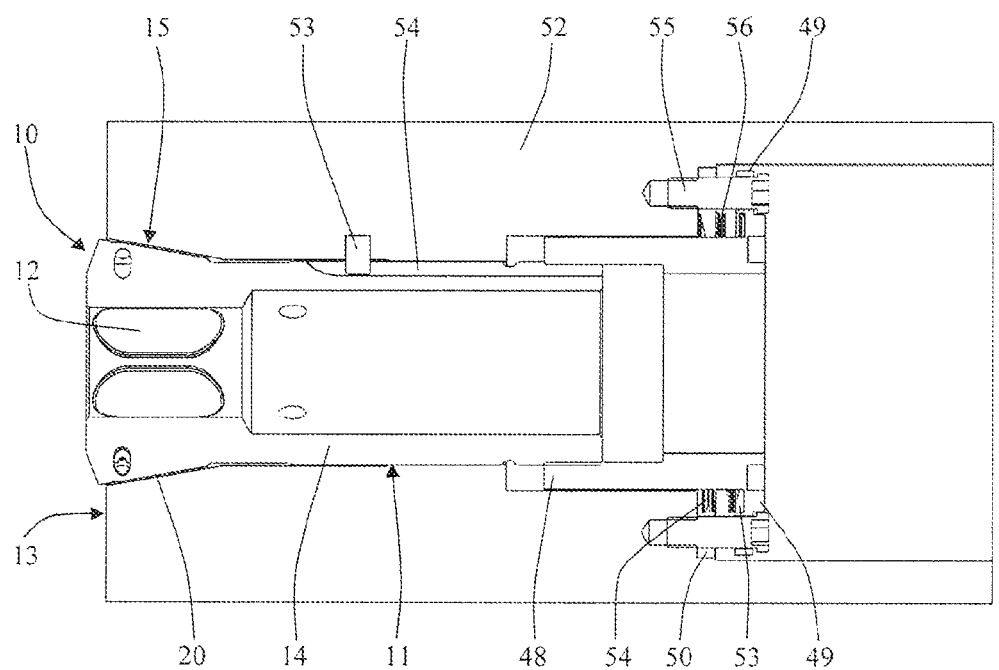
FIG. 13 is a view similar to FIG. 12, according to a second embodiment.

FIGS. 9 to 13 illustrate the holding device 10 of the invention as it is used on a machine, for instance with a view to the machining of the mechanical piece 17 to be maintained. More precisely, FIGS. 9 and 10 illustrate the use of a holding device in the shape of large opening width tongs as illustrated by FIG. 1 in particular. FIG. 11 concerns a maintaining device in the shape of a clamping chuck shown in FIG. 2. The embodiment represented by FIG. 11 uses a holding device represented by the FIGS. 2 and 8. FIGS. 12 and 13 represent a holding device in the shape of a guide bush disclosed in FIG. 3.

In FIG. 9, the device is open, which allows the positioning and the retraction of the piece. In FIG. 10, the sliders are pressed towards the centre of the central bore so as to maintain the piece 17.

In the embodiment disclosed with these FIGS. 9 and 10, the cap 23 is connected to a shaft 36 surrounding the body 14 of the maintaining device. The slider-holder 11 is mounted on a socket 37 so as to be integral with the latter. The socket receives a conical element 38 being able to slide along the shaft 36. The conical element 38 is connected to a jack 39 conceived for displacing this conical element forwards and backwards.

The shaft 36 comprises two cocks 40 being able to pivot around an axis 41 integral with the shaft 36. The cocks have a rear lug 42 for resting against the socket and a side lug 43 for resting against an inclined area of the conical element 38.

When the jack 39 is activated for moving back the conical element 38, the side lugs 43 of the cocks supported by the inclined areas move away from the central bore 16. The cocks 40 pivot around the axis 41 integral with the shaft. The ends of the rear lugs 42 supported by the socket 37 press the latter forward. The cap 23 being maintained, the frontward displacement of the slider-holder 11 has the effect of pressing the sliders 12 towards the centre and thus, to maintain the piece 17 between the sliders.

When the jack 39 is operated for moving the conical element 38 forward again, the cocks 40 pivot in their position shown by FIG. 9. The rear lugs 42 do not press the socket forward any longer. The latter can regain its rear position, which has the effect of displacing the slider-holder 11 in relation to the cap 23. The common action of the bars 29 and of the return springs 32 press the sliders 12 outward and thus free the mechanical piece 17.

In the embodiment disclosed by the FIGS. 8 and 11, the actuation element 13 of the sliders is an actuation cylinder 44 arranged around the head 15 and around at least a part of the body 14 of the slider-holder 11. This actuation cylinder 44 comprises a cylindrical area 45 in which the body can move longitudinally. It furthermore comprises a conical area 46 disposed near the head 15 and the sliders 12 when the maintaining device 10 is mounted.

In this embodiment, the slider-holder 11 is associated with the actuation cylinder 44 in a not rigid way like in the embodiment of FIGS. 9 and 10. Indeed, the slider-holder 11 can move longitudinally in this actuation cylinder 44. The holding device 10 can have a hood 47 arranged around the head 15 of the slider-holder 11 and integral with the latter.

This hood 47 can have the same external look as the cap 23, but it does not play the role of actuation element of the sliders. This actuation element is formed by the actuation cylinder.

The conical area 46 of the actuation cylinder comes in contact with the sliders 12 when this actuation cylinder is displaced forward. The slider-holder 11 is generally maintained in a maintained longitudinal position thanks to keeping the hood 47 in a maintained position.

This frontward displacement of the actuation cylinder has the effect to press the sliders 12 towards the central bore and thus to maintain the piece.

The displacement of the actuation cylinder can be carried out in the same way as the displacement of the slider-holder such as illustrated by the FIGS. 9 and 10.

The use of a cap 23 or a hood 47 around the head shows several advantages. It is for instance possible to inject air under pressure or a fluid into the cap 23 or the hood 47. This allows to take away possible splinters or to avoid that they enter in the head while machining pieces. It also allows to cool the holding device as well as the piece during machining. It is also possible to provide a channel of fluid on or in the body 14 of the device, for an injection of fluid under pressure, so as to chase away splinters and other waste.

In the embodiment disclosed in FIG. 12, the holding device 10 of the invention is maintained in a rigid way on the machine used for machining. This holding device 10 comprises a nut 48 with a ring 49. This ring has holes 50 allowing to position the nut 48 on locking screws 51 secured to the structure 52 of the processing machine. The nut rests rigidly on the structure by means of the locking screw 51. The structure of the machine furthermore comprises a guide key 53 cooperating with a groove 54 in the body 14 of the holding device 10. This guide key 53 is intended to allow a longitudinal guidance of the holding device 10, while preventing its rotation. When positioning the maintaining device, the guide key 53 and the groove 54 are positioned so as to co-operate, then the device is placed against the structure 52 of the machine and it is maintained by means of the locking screw 51. Thus, the maintaining device is rigid in relation to the structure of the machine.

In the embodiment disclosed in FIG. 13, the holding device 10 comprises a nut 48 similar or identical to the nut disclosed in FIG. 12. This nut 48 is however not rigidly maintained at the structure 52 of the machine. The structure comprises a housing 53 in which a part of the nut 48 can be placed, in particular the ring 49 of this nut. This housing terminates by a wall 54 placed towards the front of the machine i.e. towards the area in which the piece is machined. Push-pull pins 55 secured to the structure of the machine are arranged in such a way as to traverse the holes 50 of the ring 49 of the nut 48, in order to prevent the rotation of the nut and of the maintaining device as a whole, while authorizing its translation. A compression spring 56 is placed around the nut 48, so as to rest on the one hand against the ring 49 of the nut and on the other hand against the wall 54 of the housing 53. This spring 56 has the effect to press the nut 48 backwards and accordingly the maintaining device 10.

The shape of the holding device is such that this pressure backwards generates a clamping pressure of the sliders 12. Thus, regardless of the diameter of the piece to be machined, if this diameter remains in a diameter range that the holding device can receive, the sliders 12 will always apply a constant force on the piece. This allows to obtain a particularly precise machining, even if the concentricity defects and the diameter fluctuations are significant. In practice, it is possible to machine pieces with tolerances lower than 5 hundredths of millimeters from bars the diameter fluctuations of which are higher than 7 tenths of millimeters.

It should be noted that the spring 56 can take several shapes. It can be formed, as in the disclosed embodiment, by a single spring, placed around the nut 48. It could be replaced by several springs arranged for instance around push-pull pins 55 secured to the structure 52. These springs can be formed by elastic blades or full elements realized in an elastic material for instance.

As we can see in FIGS. 9 to 13, the conical area 20 which acts on the sliders 12 of the holding device, or more generally on the actuation element 13, is connected with the structure 52, unlike the devices for maintaining of prior art in which the actuation elements are always guided by the maintaining element itself. The fact that this actuation element is connected with the structure allows to ensure an optimal centring and positioning so that the precision of machining the pieces is still increased.

The device according to the invention can be modified without its operating principle being modified. The conical areas of sliders can be placed towards the back of the head i.e. at the side of the body, or rather, towards the front.

Thanks to the fact that the sliders are independent from one another, the displacement of the actuation elements has the effect to centre the piece to be maintained, without using a complex and specific centering device.

Thanks to the fact that the actuation elements are centred in relation to the structure of the machine, the positioning of the holding device is particularly precise and allows to obtain a particularly precise machining.

The invention claimed is:

1. A device for holding mechanical parts, comprising:
   a slider-holder formed by a body and by a head, both having a central bore in which a first portion of the part to be held is placed, the slider-holder configured to hold the part to be held such that a second portion extends from the head, the head comprising a conical area;
   at least two sliders each including at least one of a curved front face and a curved rear face; and
   an actuation element for said sliders;
   wherein at least two lateral bores are formed in the head, each bore leading on the one hand into said conical area and on the other hand into said central bore, wherein said sliders are each placed in one of said lateral bores, the sliders being adjusted in the lateral bores in order to be able to slide therein and be guided therein, said sliders exceeding the conical area of said head, the actuation element of said sliders being arranged to displace said sliders in the corresponding lateral bores along an axis perpendicular to a longitudinal axis of the central bore, wherein the actuation element and the body are movable relative to each other along the longitudinal axis of the central bore, and wherein the head comprises a front face comprising an uninterrupted annular zone between the central bore and the at least two lateral bores.

2. The device according to claim 1, wherein the actuation element is a cap covering the head of the slider-holder, the cap comprising a central passage arranged in line with said central bore and a conical inner area placed near said conical area of the head of the slider-holder.

3. The device according to claim 2, wherein the conical inner area of the cap comprises at least two parts with different cone angles.

4. The device according to claim 1, wherein the actuation element is an actuation cylinder arranged at least partially around the slider-holder in order to be capable of moving longitudinally in relation to the slider-holder, the actuation cylinder comprising a conical area placed near the sliders.

5. The device according to claim 4, wherein the conical area of the actuation cylinder comprises at least two parts with different cone angles.

6. The device according to claim 4, wherein the head of the slider-holder is at least partially surrounded by a hood.

7. The device according to claim 1, wherein the head of the slider-holder comprises at least one groove crossing the lateral bores, wherein the sliders comprise a cross slit and wherein the device comprises a bar crossing the groove and the cross slit of the slider.

8. The device according to claim 7, wherein the slider comprises a threaded hole arranged for receiving an adjusting screw and a return spring supported on the one hand by the adjusting screw and on the other hand by said bar.

9. The device according to claim 1, wherein the actuation element is stationary in rotation in relation to the head.

10. The device according to claim 1, further comprising a nut arranged for maintaining said device on a processing machine for mechanical pieces.

11. The device according to claim 10, wherein the nut comprises a ring with holes arranged to co-operate with pins attached to said processing machine.

12. The device according to claim 10, further comprising a spring arranged between said nut and the processing machine, the spring being operable to apply a pressure on the device in a direction opposed to a machining area of the mechanical piece.

13. The device according to claim 10, wherein the actuation element for the sliders is positioned in relation to said processing machine.

* * * * *